United States Patent [19]

Woodell

[11] 3,879,519
[45] Apr. 22, 1975

[54] FLASH EXTRUSION PROCESS
[75] Inventor: Rudolph Woodell, Richmond, Va.
[73] Assignee: E. I. du Pont de Nemours and Company, Wilmington, Del.
[22] Filed: Aug. 27, 1973
[21] Appl. No.: 391,523

[52] U.S. Cl........... 264/205; 260/2.5 N; 260/33.8 R; 260/33.4 R; 264/53
[51] Int. Cl. .............................................. D01f 7/00
[58] Field of Search....................... 264/205, 49, 53; 260/33.8 R, 33.4 R, 2.5 N, 785

[56] References Cited
UNITED STATES PATENTS
3,450,650  6/1969  Murata........................... 260/2.5 M
3,674,719  7/1972  Jenkins .......................... 260/33.8 R
3,691,092  9/1972  Floria............................. 260/33.4 R
3,730,918  5/1973  Teti et al........................ 260/33.4 R Primary Examiner—Jay H. Woo

[57] ABSTRACT

A flash-extrusion process for preparing plexifilamentary structures of PACM-12 employs a mixed solvent consisting essentially of hexafluoroisopropanol and dichlorofluoromethane.

3 Claims, 1 Drawing Figure

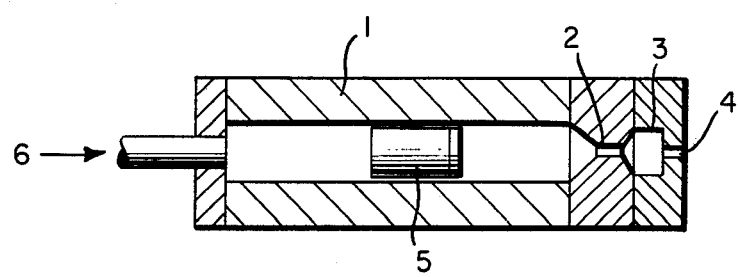

३,८७९,५१९

FLASH EXTRUSION PROCESS

FIELD OF THE INVENTION

This invention concerns a process for preparing fibrous products of poly[bis(4-aminocyclohexyl)methane dodecanediamide] hereinafter abbreviated PACM-12. More particularly, it concerns a flash-extrusion process for preparing plexifilamentary structures of PACM-12 by employing a mixed solvent consisting essentially of hexafluoroisopropanol and dichlorofluoromethane.

DESCRIPTION OF THE PRIOR ART

PACM-12 is known to be a polymer which is particularly useful for preparing synthetic fibers having a combination of highly desirable properties, e.g., good tensile strength and high work recovery, a high rate of crystallization at elevated temperatures, good thermal resistance, dyeability, etc., see e.g., Speck U.S. Pat. No. 3,393,210. Furthermore, Blades et al. U.S. Pat. No. 3,227,784 discloses a flash-extrusion process for preparing fibrous plexifilamentary products from crystalline polymers, which products have utility in various applications, including formation of nonwoven sheet structures. Such nonwoven sheet products in turn have utility in a multitude of applications, including disposable or limited-wear garments. Thus, it would be desirable to prepare plexifilamentary structures from PACM-12 polymer thereby combining the advantages of the two technologies. A number of candidates were tested for use as the "activating liquid" required for the flash-extrusion process. The candidates were selected on the basis of appropriate boiling point, probable inertness with respect to the polymer, and likelihood of adequate solvent power. However, on testing they proved to be unsatisfactory, i.e., either because the polymer remained insoluble in the candidate activating liquid at all reasonable temperatures, or because only two-phase solutions could be formed (at least under autogenous pressure), and/or degradation of the polymer at flash-spinning temperatures in the presence of the candidate activating liquid was too severe, etc. A two-component solvent system has now been discovered which permits flash-spinning of high-quality plexifilamentary products of PACM-12.

SUMMARY OF THE INVENTION

According to the present invention, a process suitable for preparing a plexifilamentary structure of poly[-bis(4-aminocyclohexyl)methane dodecanediamide] comprises forming a solution of the polymer in a mixed solvent consisting essentially of a major proportion of dichlorofluoromethane and a minor proportion of hexafluoroisopropanol, heating said solution to a temperature in the range of 170° to 210°C. under a super-autogenous pressure sufficient to maintain said solution as a one-phase system, and extruding said heated solution into a region at substantially lower pressure whereupon flash-vaporization of substantially all of said solvent occurs and solid polymer is precipitated as a plexifilamentary structure. The preferred extrusion temperature range is from 180° to 200°C., and in the most preferred process, the solution is extruded into a region of reduced pressure just upstream of the region where flash-vaporization of the solvent occurs, and wherein the solution will momentarily be exposed to an intermediate super-autogenous pressure which permits a two-phase liquid system to form.

The novel spinning system of the present invention comprises a mixture of from 10 to 20 percent by weight of PACM-12 in a mixed solvent comprising a major amount of dichlorofluoromethane and a minor amount of hexafluoroisopropanol. More particularly, the composition contains from 10 to 20 percent by weight of PACM-12, from 10 to 20 percent by weight of hexafluoroisopropanol and the remainder dichlorofluoromethane.

DEFINITIONS

A. "Plexifilament" as employed in this specification refers to a continuous strand or web of fibrous material, consisting of an integral plexus of interconnected fiber-like elements having an average denier less than one dpf and generally having lengths ranging from several millimeters to several centimeters, which elements are called "film-fibrils" in view of their thin ribbon-like character. These film-fibril elements intermittently unite with and separate from other film-fibril elements at irregualr intervals throughout the width, length, and thickness of the plexifilament, thereby forming a three-dimensionally interconnected plexus. Plexifilamentary strands resemble in general appearance a spun yarn of very fine staple; however, they are distinguished therefrom in that each film-fibril element is joined into the plexus at each terminus (i.e., there are essentially no loose fiber ends present) and the plexifilament is therefore a single, unitary, polymeric structure. As disclosed in U.S Pat. No. 3,169,899, a plexifilamentary strand may be spread laterally to form a continuous thin fibrous web which may be deposited in either random or programmed (overlapping) fashion to form a nonwoven sheet structure with manifold utilities, as mentioned earlier. Such a product is referred to herein as a plexifilamentary sheet or plexifilamentary web.

B. "Autogenous pressure" means the equilibrium vapor pressure (self-generated in a closed system) which is exerted by a solvent or solution at any given temperature, including temperatures above the normal boiling point. "Super-autogenous pressure" means a pressure in excess of the autogenous pressure, as may be provided, e.g., by mechanical means such as a piston or pump, or with an external source of an (insoluble) high pressure gas, such as nitrogen.

C. "Flash-vaporization" refers to the extremely rapid (less than one second) vaporization which occurs when a solution at autogenous or super-autogenous pressure is abruptly introduced into a region at substantially lower pressure. "Flash-spinning" or "flash-extrusion" are terms applied to extrusion of a polymer solution under conditions such that flash-vaporization of the solvent occurs, thereby precipitating the residual polymer. Under certain controlled conditions, flash-spinning will produce a plexifilamentary product.

DESCRIPTION OF THE DRAWING

The FIGURE depicts an apparatus suitable for practicing the Examples hereinafter described.

Cylindrical pressure vessel (1) terminates at one end in an extrusion assembly comprising a cylindrical pressure letdown orifice (2) having tapering entrance and exit angles. Downstream from this orifice is a cylindrical pressure letdown chamber (3) and finally a cylindrical spinneret orifice (4). The letdown orifice, the letdown chamber and the spinneret orifice are all coaxial with the axis of the pressure vessel. Floating piston (5) is located in the chamber of pressure vessel (1) and port (6) provides entry for gas to be applied against the upstream face of the piston (5).

DESCRIPTION OF THE PREFERRED EMBODIMENTS

In accordance with the present invention, a mixture of, e.g., 10–20 percent by weight PACM-12, 10–20 percent by weight hexafluoroisopropanol (HFIP) plus sufficient dichlorofluoromethane to total 100 parts is confined in a closed system (dichlorofluoromethane boils at approximately 9°C.) and stirred to form a homogeneous solution. This solution is heated to a temperature of from about 170°–210°C. under sufficient pressure to maintain the solution as a single phase system, e.g., 1500–2000 psig. This solution is passed into a small "letdown" chamber of, e.g., 0.5 to 10 ccs. volume, through a suitably sized orifice such that the pressure falls to a lower (but still super-autogenous) pressure corresponding to a two-phase solution. After a brief residence in this letdown chamber (less than one second) the solution is extruded abruptly through a final orifice (spinneret orifice) into a region at substantially lower pressure, e.g., atmospheric pressure, whereupon flash-vaporization occurs and a plexifilamentary product is generated. These products have utility in the form of continuous fibrous strands (in either as-spun or post-drawn form), e.g., as textile yarns in weaving and knitting operations, as strands in twine, rope, cord, etc., and as tire cords, etc., or — as described above — they may be spread into a web and deposited to form nonwoven plexifilamentary sheets, and emboss bonded to form attractive, useful, disposable garments, coating substrates, protective wrapping, etc.

None of the candidates for activating liquids, selected on the basis of the teachings in U.S. Pat. No. 3,227,784, proved satisfactory for flash extrusion of PACM-12. Either no solution is formed at any reasonable temperature, or else if solubility is achieved at elevated temperature, only two-phase solutions are formed at autogenous pressure. Although two-phase solutions are desirably formed (momentarily) in the pressure letdown chamber for improved plexifilament generation (see U.S. Pat. No. 3,227,794 for discussion of the advantages of this feature and description of technique for studying and locating the two-phase boundary region), they are undesirable in the solution preparation, transfer lines, accumulator, etc. sections of the apparatus where they lead to layering, precipitation on the walls of the conduits, nonuniform polymer concentration, erratic feeding, and variability — and even discontinuities in extreme cases — in plexifilament generation.

The present invention not only provides a system whose two-phase/one-phase character may readily be controlled, but also provides a number of additional advantages. For example, plexifilaments of PACM-12 may be flash-spun from the compositions of the present invention without experiencing the extreme polymer degradation which occurs when other solvent candidates are employed. Furthermore, the present compositions form a single-phase solution at room temperature under modest pressure, thus greatly facilitating mixing, dissolving, filtration, pumping, and storage. In addition, such solutions are readily converted into two-phase systems at elevated temperatures and pressures which are suitable for flash-spinning, and which may be held prior to extrusion in one-phase condition at somewhat higher pressures which are still conveniently attainable. Thus, the spin mix can be prepared and stored at relatively low pressures and temperatures (e.g., room temperature), and when desired, raised to a higher pressure, and heated rapidly to the optimum temperature for flash-spinning by passing the solution through a heat-exchanger, thereby avoiding prolonged exposure of the polymeric solution to high temperatures and minimizing the complications of high pressure solution handling.

It has now been discovered that a mixture of a minor proportion of HFIP with a major proportion of dichlorofluoromethane serves as a good solvent for flash-spinning plexifilaments of PACM-12. HFIP is a solvent for PACM-12 at room temperature. However, it is not suitable by itself for flash-spinning PACM-12 since its vapor pressure at temperatures up to the point where polymer degradation becomes severe is too low to provide optimum "blowing force" for good plexifilament generation, and furthermore, even if reasonably good plexifilaments could be generated, the nascent plexifilamentary product would be unstable in the presence of high concentrations of such powerful solvent vapor. Similarly, dichlorofluoromethane by itself is also unsuitable for flash-spinning PACM-12, since the polymer is insoluble in this liquid at all reasonable temperatures. However, dichlorofluoromethane is particularly suitable as the "blowing force/nonsolvent" component in the mixed solvent of the present invention since it has been discovered to be particularly innocuous with regard to inducing polymer degradation at the elevated flashextrusion temperatures.

The relative proportion of HFIP to dichlorofluoromethane in the solvent mixture is not critical, and may be adjusted for optimum flash-extrusion performance according to several considerations. First, for maximum advantage in mixing, handling, etc., it is convenient to employ sufficient HFIP that the polymer will be soluble in the mixture to form a one-phase solution at room temperature. This minimum HFIP content is not a fixed value, however, since the solubility of PACM-12 in HFIP decreases with increase in the trans-trans (tt) diamine isomer in the polymer. For example, for PACM-12 having 45 percent tt isomer, approximately 50 percent based on polymer of HFIP will provide a one-phase solution at room temperature, while for PACM-12 having 70 percent tt isomer, a minimum ratio of roughly 1:1 HFIP to polymer is required. Second, to maximize the "blowing power" of the system, and also to minimize the tendency for the residual solvent vapor to redissolve the plexifilamentary product, it is usually desirable to keep the quantity of HFIP in the mixture at a low level. Third, although it is desirable to have a one-phase system at room temperature for convenience in handling, for best plexifilament formation the solution should be two-phase in the letdown chamber at the extrusion temperature. The temperature at which the system (under autogenous pressure) becomes two-phase may conveniently be adjusted higher or lower by simply increasing or decreasing the proportion of HFIP. Since flash extrusion will be carried out between 170°–210°C., the twophase temperature under autogenous pressure should occur at a temperature less than 170°C., and values in the range of 120°–150°C. have been found satisfactory. Two-phase temperatures below 120°C. are not preferred, since inordinately high super-autogenous pressures would be required to hold the bulk of the spin solution in a single phase condition at the spin temperature prior to extrusion. (The particular value of the two-phase temperature at autogenous pressure for any given composition may be determined by charging a quantity of the chosen proportions of polymer, HFIP and dichlorofluoromethane to approximately half fill a glass ampoule, which is then sealed and gradually heated, while periodically inverting the ampoule to insure good mixing of its contents, until the temperature is reached at which two liquid phases are observed to form.) In view of the fact that polymer concentrations in the range of 10–30 percent are usually preferred for flash spinning, the above considerations lead to the general rule that the mixed solvent should consist of a minor proportion (i.e., less than 50 wt. percent) HFIP and a major proportion (greater than 50 wt. percent) dichlorofluoromethane, base on total mixed solvent.

The solutions as defined above may also contain small quantities of other ingredients, if desired, such as pigments, dyes, antistats, bacteriostats, polymer degradation inhibitors, UV screeners, finely divided nucleation assistants, surfactants, etc.

EXAMPLE

The flash-extrusion experiments exemplifying the present invention employ a "batch" spinning procedure, although a continuous process, analogous to that of U.S. Pat. No. 3,227,794, is also within the scope of the invention. In each of the following runs, the indicated ingredients are charged into a cylindrical pressure vessel ¾ inch in diameter and 4-¾ inches in length, indicated as 1 in the FIGURE. The cylindrical pressure letdown orifice, 2, has 60° tapering entrance and exit angles, and diameter and land lengths as specified in the Table. The cylindrical pressure letdown chamber, 3, has a volume of 0.5 cc. The cylindrical spinneret orifice, 4, has land lengths as specified in the Table. The apparatus is prechilled to facilitate charging the ingredients indicated in the Table (the dichlorofluoromethane boils at approximately 9°C.). A temporary closure is applied externally on the spinneret orifice, and the solutions are confined in the pressure vessel between this extrusion assembly and a floating piston, 5, which has applied to its upstream face pressurized nitrogen gas through port 6 to provide the indicated (super-autogenous) pressures on the solutions during extrusion. The entire pressure vessel and contents are placed into an electrically heated oven until the desired extrusion temperature is attained, the spinneret closure is removed, and flash extrusion commences and continues until the solution is exhausted. Extrusion occurs into the ambient (room temperature and pressure) atmosphere, and the residual HFIP concentration becomes too dilute to exert any appreciable deleterious resolvation of the plexifilamentary products.

TABLE

| | Solution Composition (Pts. by Wt.) | | | Letdown Orifice | | Spin Orifice | | Spin Solution | |
|---|---|---|---|---|---|---|---|---|---|
| Run | Pol.* | HFIP** | Dichlorofluoromethane | Dia. | Land | Dia. | Land | Temp. | Pres. |
| 1 | 10 | 9 | 81 | 0.025" | .025" | 0.024" | .024" | 180°C. | 1500 psig. |
| 2 | 10 | 9 | 81 | " | " | 0.021" | .021" | 200°C. | 2000 psig. |
| 3 | 10 | 9 | 81 | " | " | " | " | 210°C. | " |
| 4 | 10 | 9 | 81 | " | " | " | " | " | " |
| 5 | 16 | 9 | 75 | " | " | " | " | 200°C. | " |
| 6 | 15 | 15 | 70 | " | " | " | " | " | " |
| 7 | 10 | 18 | 72 | " | " | " | " | " | " |
| 8 | 15 | 15 | 70 | " | " | " | " | " | 1500 psig. |
| 9 | 15 | 15 | 70 | " | " | " | " | 190°C. | 2000 psig. |
| 10 | 16 | 9 | 75 | 0.024" | .024" | 0.022" | .022" | 200°C. | 1950 psig. |

*PACM-12, 45% tt isomer, 31 relative viscosity¹. Runs 1–6, 8–10. PACM-12, 70% tt isomer, 45 relative viscosity¹, Run 7.
**Hexafluoroisopropanol.
¹measured in a solvent mixture of 50/50 by weight of formic acid and phenol. 3.7 Grams of the polymer is dissolved in 50 cc. of the solvent.

A continuous fibrillated plexifilamentary product is obtained from all runs (except No. 3, whose product is discontinuous "fly," presumably due to insufficient mixing of the solution prior to extrusion, and an apparent thermal degradation experienced by the polymer). The plexifilamentary products of Runs 2, 5, 6, 9, and 10, produced under the most preferred spinning conditions, are finely fibrillated, fly-free, and uniform. The product of Run 7, though continuous and fibrillated, is somewhat nonuniform, and improved spinning and product would be anticipated empolying somewhat smaller proportions of HFIP.

These as-spun PACM-12 plexifilamentary products exhibit a rubber-like elasticity when subjected to small cyclic stresses, and also a "coalescible" property, i.e., the individual film-fibrils tend to become fused together and the product takes on a permanent "set" when subjected to mechanical compression, e.g., an as-spun PACM-12 plexi-filamentary web may be cold embossed by pressing a silver coin into its surface. In contrast, on exposure of the as-spun product for 3–4 minutes at 150°C., it is converted into a highly resilient fibrous product, i.e., it now exhibits high recovery from compressive force, with no trace of its former coalescible property. This change in character is believed to reflect a transformation from an amorphous polymer form to a crystalline polymer form as a consequence of the heat treatment. This feature permits as-spun plexifilamentary nonwoven sheets of PACM-12 to be shaped by cold deformation, and subsequently heated in this configuration to convert them into a resilient, stable shaped, fibrous product.

What is claimed is:

1. A process for preparing plexifilamentary structures of poly[bis(4-aminocyclohexyl)methane dodecanediamide] comprising forming a solution of from 10 to 20 percent by weight of the polymer in a mixed solvent consisting essentially of greater than 50 percent by weight of dichlorofluoromethane and at least 10 percent by weight of hexafluoroisopropanol, heating said solution to a temperature in the range of 170°–210°C. under a super-autogenous pressure sufficient to maintain said solution as a one-phase system, and extruding said heated solution into a region at substantially lower pressure whereupon flash vaporization of substantially all of said solvent occurs and solid polymer is precipitated as a plexifilamentary structure.

2. The process of claim 1 wherein the extrusion temperature is in the range of from 180°–200°C.

3. The process of claim 1 wherein the solution is extruded into a region of reduced pressure just upstream of the region where flash vaporization of the solvent occurs and wherein the solution will momentarily be exposed to an intermediate super-autogenous pressure which permits a two-phase liquid system to form.

* * * * *